(12) United States Patent
Azzali (10) Patent No.: US 12,090,519 B2
(45) Date of Patent: Sep. 17, 2024

(54) METHOD FOR CONTROLLING CONTAINERS, IN PARTICULAR MADE OF GLASS AND RELATED APPARATUS

(71) Applicant: EMS GROUP S.P.A., Montecchio Emilia (IT)

(72) Inventor: Corrado Azzali, Montecchio Emilia (IT)

(73) Assignee: EMS GROUP S.P.A., Montecchio Emilia (IT)

( * ) Notice: Subject to any disclaimer, the term of this patent is extended or adjusted under 35 U.S.C. 154(b) by 361 days.

(21) Appl. No.: 17/765,917

(22) PCT Filed: Oct. 1, 2020

(86) PCT No.: PCT/IB2020/059210
§ 371 (c)(1),
(2) Date: Apr. 1, 2022

(87) PCT Pub. No.: WO2021/064632
PCT Pub. Date: Apr. 8, 2021

(65) Prior Publication Data
US 2022/0362812 A1 Nov. 17, 2022

(30) Foreign Application Priority Data
Oct. 3, 2019 (IT) .................. 102019000017882

(51) Int. Cl.
*B07C 5/34* (2006.01)
*B65B 57/00* (2006.01)
(Continued)

(52) U.S. Cl.
CPC ............. *B07C 5/3408* (2013.01); *B07C 5/34* (2013.01); *B65B 57/00* (2013.01); *B65G 15/16* (2013.01); *B65G 47/2445* (2013.01)

(58) Field of Classification Search
CPC ......... B65B 57/00; B07C 5/34; B07C 5/3408; B65G 15/14; B65G 15/16; B65G 47/2445
(Continued)

(56) References Cited

U.S. PATENT DOCUMENTS 4,934,510 A * 6/1990 Lutgendorf ............ B65G 15/50
198/398
5,492,216 A * 2/1996 McCoy .................. B65G 15/14
198/833
(Continued)

FOREIGN PATENT DOCUMENTS

EP          3249345 A1    11/2017
WO   WO-2005085103 A1 *  9/2005 ......... B65G 47/2445
WO       2016092079 A1     6/2016

*Primary Examiner* — James R Bidwell
(74) *Attorney, Agent, or Firm* — Carmel Patent Agency; Robert Ballarini (57) ABSTRACT

Method for controlling the mechanical strength of a container, in particular made of glass, by a control apparatus which provides for actuating the control on a control zone extending along an entire circumferential perimeter of the outer surface of the container in which it provides for forwarding the container according to a forwarding direction, simultaneously rotating the container about the axis of symmetry thereof orthogonal to the forwarding direction, then controlling the container during the rotation, exerting a control pressure onto the control zone, the control being divided into several steps, in which in each step it is provided to exert the control pressure on a respective portion of the control zone and which provides that each single container is subjected in sequence to each step during the forwarding thereof and the rotation thereof.

20 Claims, 5 Drawing Sheets

(51) Int. Cl.
*B65G 15/16* (2006.01)
*B65G 47/244* (2006.01)

(58) Field of Classification Search
USPC .............................. 198/626.1, 626.4, 626.5
See application file for complete search history.

(56) References Cited

U.S. PATENT DOCUMENTS

| | | | | |
|---|---|---|---|---|
| 5,573,103 | A | * | 11/1996 | Novak ...................... B08B 9/46 198/604 |
| 5,701,990 | A | * | 12/1997 | Novak ............... B65G 47/2445 198/604 |
| 2007/0163212 | A1 | * | 7/2007 | Varhaniovsky ...... B65G 47/244 53/471 |
| 2017/0081129 | A1 | * | 3/2017 | Parsons .................. B65G 23/44 |

* cited by examiner

METHOD FOR CONTROLLING CONTAINERS, IN PARTICULAR MADE OF GLASS AND RELATED APPARATUS

FIELD OF THE INVENTION

The present invention falls within the field of control systems for containers, in particular made of glass. Said control systems generally operate on the empty container and are inserted inside the production lines of said containers, or filling lines. In particular, we will refer to controls related to the mechanical strength of the container.

BACKGROUND

Empty containers, such as bottles, jars made of different materials, for example glass, are generally subjected to various controls before any filling.

The controls may include vision systems which check the container without coming into contact therewith or systems which, on the contrary, carry out checks by means of contact with the container.

For example, vision systems can carry out checks aimed at detecting any imperfections in the material or dimensional checks to control the correct measurements of the container, to be carried out on the various parts thereof, such as the neck, the mouth, the bottom of the container, etc.

The controls which carry out checks by coming into contact with the container can, for example, test the mechanical strength of the container to evaluate the ability thereof to withstand internal or external pressure once filled or stored.

The object of the invention falls within the scope of said control devices by means of contact.

Devices are known in the state of the art which carry out the control on the container by exerting pressure onto the outer surface of the container itself, in particular on a specific zone which we will also call control zone hereinafter. Said control zone generally extends along the entire circumferential perimeter of the outer surface of the container.

Generally, the known control systems provide for forwarding the container through forwarding means adapted to bring it at a thrust device configured to exert a given pressure. Said thrust device is for example a movable guide which is pushed by means of actuators against the outer surface of the container.

Said guide is movable towards/away from the container and perpendicular to the forwarding direction thereof.

The pressure is exerted by the guide while the container is rotated, by means of suitable rotation means so as to extend said control over the entire circumferential perimeter thereof.

Therefore, while the thrust device exerts the control pressure, said container moves forward along the entire thrust device and at the same time carries out a rotation of at least 180° to allow the pressure to be exercised along the entire circumferential perimeter thereof.

The guide has a length such as to allow the container to rotate at least 180° while it is forwarded on the forwarding means.

With this solution, the control apparatus is capable of controlling one container at a time. In fact, if the movable guide were to exert pressure onto more than one container at the same time, it would not be possible to be certain that the pressure exerted is the same on the various containers.

In fact, it could happen that a container has slightly larger dimensions than the others and therefore the guide would exert a greater pressure thereon than on the other containers controlled at the same time.

This solution therefore has the disadvantage of not allowing high control rates to be reached, which therefore prevents the use thereof in high-rate production lines, such as those of glass factories generally.

In fact, having to control one container at a time, it is necessary to space the containers by a distance greater than the length of the control apparatus or of the respective movable guide which exerts the pressure onto the container. Consequently, the greater the space between the containers, the greater the speed of the forwarding means must be to meet the required production rate.

Therefore, said forwarding means must go very fast and this is often incompatible with the stability of the containers.

SUMMARY

The technical problem underlying the present invention is that of making available to the art a control apparatus for containers, preferably made of glass, structurally and functionally conceived to overcome one or more of the limits set out above with reference to the cited known art.

Within the scope of the above problem, a main object of the invention is to provide an apparatus and relative method for controlling containers which allows to guarantee an effective control, reaching high rates.

It is also an object of the present invention to allow the mechanical strength of the containers to be controlled dynamically and without moving the containers at overly high speeds, which may affect the stability and integrity thereof.

A further object of the invention is also that of making available to the art an apparatus for controlling containers in the context of a simple, rational solution with a rather low cost.

These and other objects are reached by the characteristics of the invention as set forth in the independent claims. The dependent claims outline preferred and/or particularly advantageous aspects of the invention.

In particular, an embodiment of the present invention makes available a method for controlling the mechanical strength of a container, in particular made of glass, which provides for actuating the control of a control zone extending along an entire circumferential perimeter of the outer surface of the container.

Said method provides at least the steps of forwarding the container, at the same time making it rotate about the axis of symmetry thereof.

Said axis of symmetry, and therefore the axis of rotation, is preferably arranged orthogonal to the forwarding direction of the container.

Said method further provides for controlling the container, during rotation, by exerting a control pressure onto the control zone.

The method provides that the control is divided into several steps, in which in each step it is provided to exert said control pressure onto a respective portion of the control zone. Preferably, the method further provides that each single container is subjected in sequence to each step during the forwarding thereof and the rotation thereof, so that while a container is subjected to a certain control step, the preceding container is simultaneously subjected to the preceding control step, while the container which follows it is simultaneously subjected to the subsequent control step.

Thanks to this solution it is not only possible to carry out a dynamic type control, but it is also possible to increase the number of containers controlled in a given time interval.

In fact, having divided the control into several steps, it is possible to carry out said control simultaneously on several containers, without affecting the correctness of the control and increasing the work rate.

According to a preferred embodiment, the control pressure is exerted along the entire circumferential perimeter during an overall rotation of the container equal to 180°; in fact, considering how the control apparatus is configured, an equal and diametrically opposite counter-pressure corresponds to said control pressure.

Therefore it is sufficient to rotate the container by 180° between the beginning of the first step and the end of the last step, to have a control around the entire circumferential perimeter thereof. This allows to further speed up the control.

In one embodiment, each control step provides for exerting the control pressure onto a respective portion of the control zone extending for a length equal to the circumferential perimeter divided by the number of steps and where said control pressure is exerted during a partial rotation of the container equal to 180° divided by the number of steps.

Thanks to said characteristic of the control method, the individual steps are all the same.

Therefore, in each step the container carries out a rotation having the same amplitude in degrees and a portion of the control zone of the same extension along the circumferential perimeter is controlled.

This facilitates the management of the control and optimizes the pitch between one container and another and consequently the work rate.

Another aspect of the invention is that of making available a control method which provides that each single container follows each step preferably continuously, that is, passing directly from one step to the next.

The advantage of this characteristic is that the control takes place dynamically, i.e., without stopping the container.

In addition, it is possible to provide that in a given step the control of a respective portion of the control zone is carried out and in the preceding and/or subsequent step the control of a respective portion of the immediately preceding and/or subsequent control zone is carried out.

Therefore, among the advantages provided there is that of having the guarantee that the entire container is controlled along the control zone and that there are no uncontrolled portions.

A further advantage is given by the control flexibility on the single container and between one container and another, since the method provides that the control pressure exerted in each step is adjustable according to the type of container.

It is also an object of the present invention to provide an apparatus for checking the mechanical strength of containers, in particular made of glass, configured to operate on a control zone extending along an entire circumferential perimeter of the outer surface of the container, comprising:

forwarding means to forward the container inside the control apparatus,
  rotation means configured to rotate the container about the axis of symmetry thereof during the forwarding movement thereof in a direction orthogonal to the axis of symmetry,
  a thrust device configured to exert a control pressure onto the control zone.

Preferably said thrust device comprises a plurality of pads, each being adapted to exert said control pressure onto a respective portion of the control zone, being arranged in succession so that each single container, by moving forward in the direction Y, interacts one after the other with all the pads.

Thanks to this solution, a control of several containers is carried out at the same time, since the thrust device is divided into several pads and this is essential for increasing the control rate of the apparatus.

An advantage of the invention is that it allows the container to be controlled dynamically, preferably during the rotation thereof by 180°.

In fact, the thrust device is movable according to a contact direction orthogonal to the forwarding direction between at least one working position and a resting position and configured so as to exert, when it is in the working position, the control pressure onto one side of the container and at the same time, pushing it against a corresponding contrast surface, generate a counter-pressure equal to the control pressure, on the diametrically opposite side of the container.

Therefore, the thrust device for carrying out the complete control exerts said control pressure during a rotation of the container greater than 180°, preferably equal to 180°, during the forwarding thereof from the first to the last pad.

One embodiment provides that the pads are arranged one after the other without leaving empty spaces between one and the other.

Therefore, among the advantages provided there is that of having the guarantee that the entire container is controlled along the control zone and that there are no uncontrolled portions.

To facilitate the management of the control and to optimize the pitch between one container and another and consequently the work rate, each pad preferably exerts said control pressure onto a respective portion of the control zone which preferably extends by a length equal to the circumferential perimeter divided by the number of pads and where said control pressure is exerted by each pad during a rotation of the container equal to 180° divided by the number of pads.

This also optimizes the constructive aspect of the apparatus since the pads are all with the same length.

A preferred aspect of the invention provides that the rotation means comprise a first operative member and a second operative member opposite each other with respect to the container which moves forward on the forwarding means and being arranged so as to engage with the outer surface of the container and generate the rotation of the container by friction. Preferably, the first and second operative members translate in the forwarding direction and can move forward in the same direction or according to opposite directions, and preferably have different translation speeds.

In particular, the first and second operative members are located to the sides of the forwarding means and comprise a flexible towing member which is wound about transmission members for the motion thereof, where said flexible towing member provides a contact surface which is so shaped as to engage with the outer surface of the container.

A preferred embodiment provides that the pads are arranged so as to push a portion of the first and/or second operative member, in the contact direction, pressing it against the container so as to exert the control pressure.

Thanks to this solution, the correct rotation of the container is guaranteed, even when subjected to the control pressure P; in fact, possible slips are avoided which would cause an uncertainty in the control of the container along the entire circumferential perimeter thereof.

BRIEF DESCRIPTION OF THE DRAWINGS

This and other features will be more apparent from the following description of some of the embodiments, illustrated purely by way of non-limiting example in the accompanying drawings.

DETAILED DESCRIPTION OF THE PREFERRED EMBODIMENTS

Figure 1:
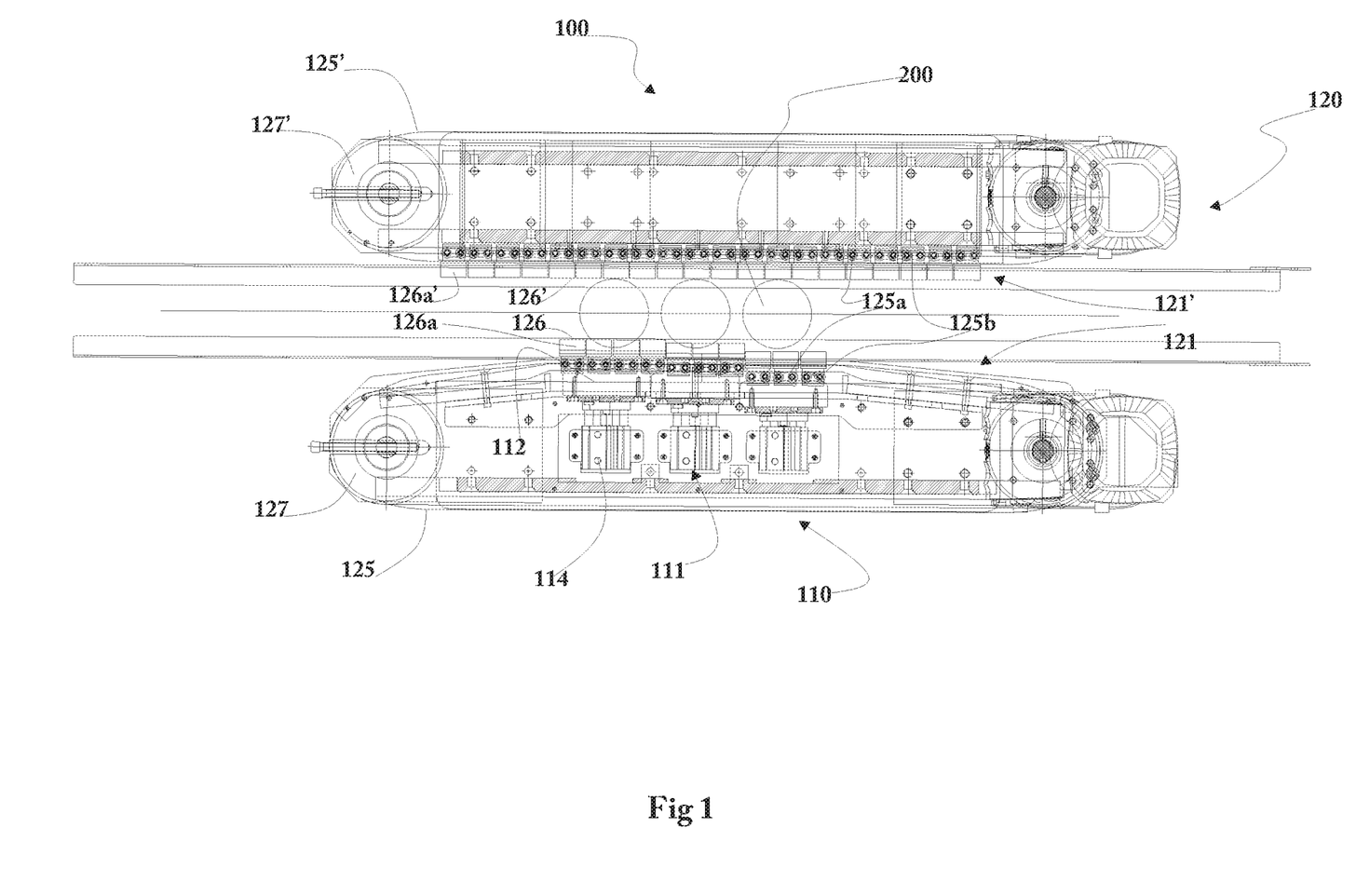
FIG. 1: illustrates in top view a control apparatus of containers.

With particular reference to FIG. 1, a control apparatus 100 of containers 200 is shown.

In particular, said apparatus 100 is configured for controlling the mechanical strength of a glass container 200. In fact, it is an apparatus 100 preferably dedicated to controlling jars or bottles or any other item/container such as vials, bottles, etc., preferably made of glass.

The apparatus 100 can also be suitable for controlling containers 200 made of a material different from glass, but in any case morphologically similar, i.e., containers 200 which require controls aimed at verifying the mechanical strength thereof.

These controls are important since said containers 200 are subsequently subjected to internal pressure due to the product which they will contain and/or external pressure due to the storage of said empty or full containers 200.

Figure 5:
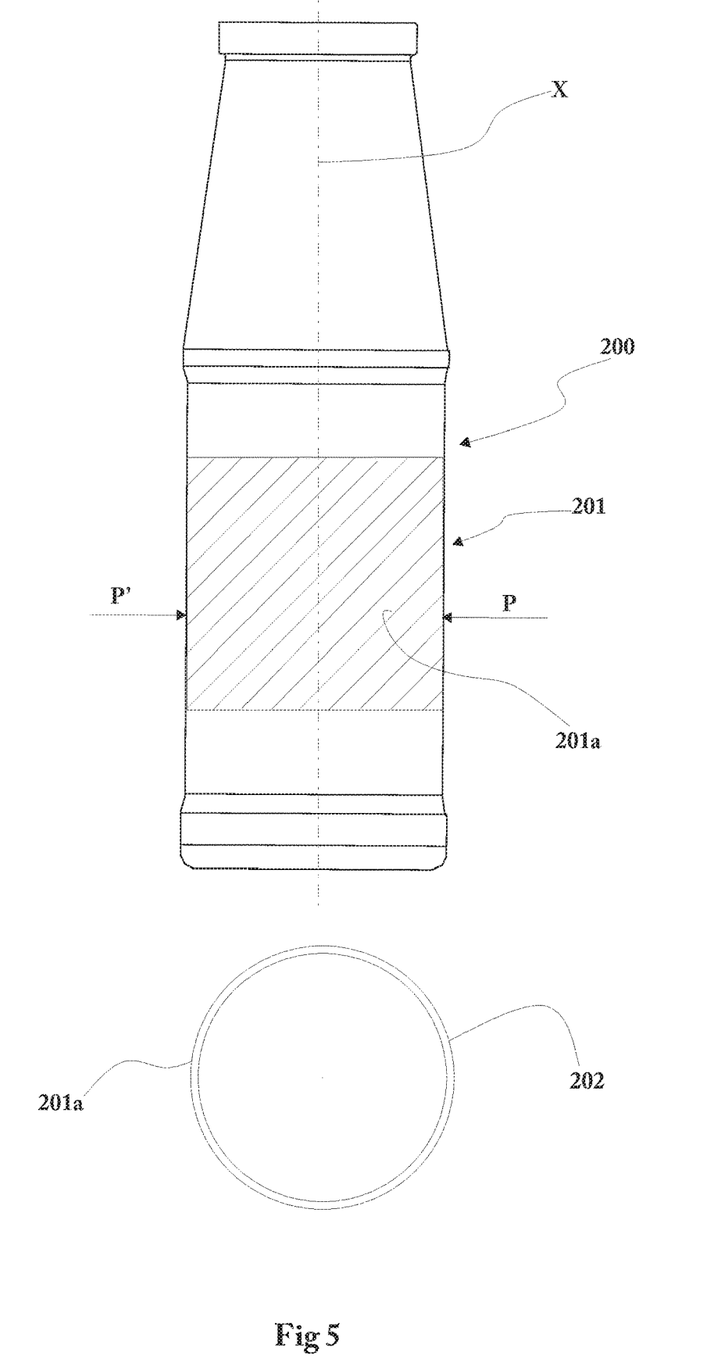
FIG. 5: illustrates a container and related control zone.

In particular, the apparatus 100 is configured to operate on a specific control zone 201a of the outer surface 201 of the container 200.

Said control zone 201a preferably extends along an entire circumferential perimeter 202 of the outer surface 201.

The outer surface 201 generally extends about a vertical axis of symmetry X of the container 200.

The apparatus 100 is therefore configured to control the container 200 along the circumferential perimeter 202 thereof and in a defined position which can be for example more or less in proximity to the base or the mouth of the container 200, depending on the type and shape of said item and the subsequent use thereof.

Furthermore, the height extension of the control zone 201a is also a function of the type and shape of said container 200 and the subsequent use thereof.

The apparatus 100 preferably comprises forwarding means 150 to forward the container 200 adapted to bring the container from the inlet to the outlet of the apparatus 100.

A preferred embodiment provides that said forwarding means 150 forward the container 200 in the direction Y, orthogonal to the axis of symmetry X.

Figure 2:
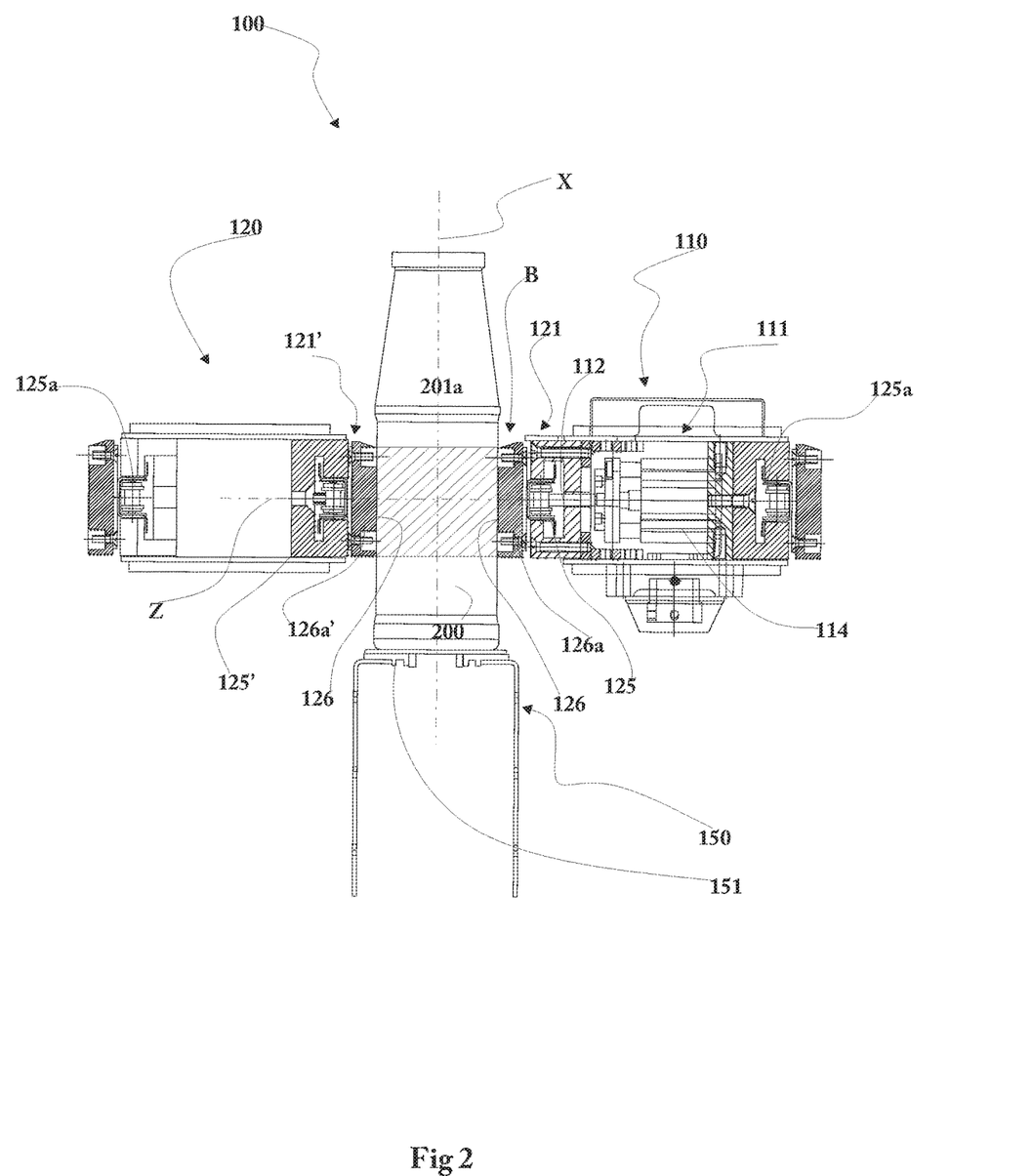
FIG. 2: illustrates in lateral section the control apparatus of containers.

As shown in FIGS. 1 and 2, said forwarding means 150 are for example a conveyor belt 151 on which the container 200 rests, maintained with the axis of symmetry X thereof vertical.

However, forwarding means 150 of a different type and which forward the container 200 with non-vertical axis of symmetry X are also considered to fall within the scope of the invention.

The speed of said forwarding means 150 is a function of both the rate of the production or filling line of the containers 200 and of the distance between one container 200 and the next.

Said distance is also called pitch and is generally measured between the axis of symmetry X of a container 200 and that of the next. As will be better explained below, said distance depends on the shape of the control apparatus 100.

The control apparatus 100 further comprises rotation means 120 configured to rotate the container 200 about the axis of symmetry X thereof during the forwarding thereof in the direction Y.

FIG. 1 shows a possible embodiment of the rotation means 120.

According to an aspect of the invention, said rotation means 120 can comprise a first operative member 121 and a second operative member 121' opposite each other with respect to the container 200 which moves forward on the forwarding means 150.

Said first and second operative members 121, 121' are preferably arranged so as to engage or come into contact with the outer surface 201 of the container 200 and generate the rotation of the container 200 by friction.

A preferred configuration provides that the first operative member 121 and/or the second operative member 121' translate in the forwarding direction Y.

An embodiment shown in FIG. 1 provides that the first operative member 121 and the second operative member 121' are located to the sides of the conveyor belt 151.

Preferably said operative members 121 and/or 121' comprise a flexible towing member 125, 125' which is wound about transmission members 127, 127' for the motion thereof.

The term flexible towing member 125, 125' means, for example, flat or toothed belts, ropes, or even a continuous articulated member as shown in FIG. 1.

In fact, FIGS. 1 and 2 show a preferred embodiment in which the flexible towing member 125, 125' is a roller chain 125a. The roller chain 125a generally comprises a plurality of links 125b hinged to each other.

The transmission members 127, 127' therefore vary according to the type of flexible towing member 125, 125'.

In the case of a roller chain 125a, the transmission members 127, 127' can be for example pinions or crowns, or in any case that which a person skilled in the art deems suitable for the motion of said roller chain 125a.

One aspect of the invention provides that said flexible towing member 125, 125', provides a contact surface 126, 126' shaped to engage with the outer surface 201 of the container 200.

As shown in FIGS. 1 and 2, said contact surface 126, 126' can comprise dowels 126a, 126a' mechanically associated with the links 125b of the roller chain 125a.

Said dowels 126a, 126a' can be made of deformable material, such as rubber, or of hard material, such as nylon or plastic in general, according to the type of container 200 and the control pressure P.

As previously described, the first operative member 121 and/or the second operative member 121' translate in the forwarding direction Y. In particular, the first operative member 121 and the second operative member 121' can translate in the forwarding direction Y in the same direction, or according to opposite directions.

Furthermore, they preferably have different translation speeds.

As will be better explained below, the difference in speed is important to allow the rotation of the container 200.

While the container 200 moves forward on the forwarding means 150, it also moves forward by rotation about the axis of symmetry X thereof. Therefore, the motion of the center of the container 200 (in which the axis of symmetry X passes) in the forwarding direction Y is given by the sum of the forwarding due to the translation by means of the forwarding means 150 and the forwarding due to the rotation of the container 200; the latter is calculated according to the laws of pure rolling motion, i.e., the rotation of a rigid body on a surface, about the central axis thereof.

Therefore the calculation of the speeds of the operative members 121 and 121' is linked both to the speed of the forwarding means 150 and to the laws of rolling motion.

The control apparatus 100 is configured to carry out the control of the container 200, while said container 200 moves forward according to the motion described above.

Therefore the control occurs dynamically, i.e., without stopping the container 200. This allows carrying out the check of the mechanical strength about the circumferential perimeter 202 more quickly.

To carry out said check of the mechanical strength of the container 200, the control apparatus 100 comprises, as shown in FIG. 1, a thrust device 110 configured to exert a control pressure P onto the control zone 201a of the container 200.

To do this, said thrust device 110 comprises a plurality of pads 111 arranged in sequence and each capable of exerting said control pressure P onto a respective portion of the control zone 201a, during the forwarding and rotation of the container 200.

Summarizing therefore, the control apparatus 100 of the mechanical strength of a container 200 preferably made of glass, configured to operate on a control zone 201a extending along an entire circumferential perimeter 202 of the outer surface 201 of the container 200, comprises:

forwarding means 150 to forward the container 200 inside the control apparatus 100, rotation means 120 configured to rotate the container 200 about the axis of symmetry X thereof during the forwarding movement thereof in a direction Y orthogonal to the axis of symmetry X, a thrust device 110 configured to exert a control pressure P onto the control zone 201a, wherein said thrust device 110 comprises a plurality of pads 111, each being adapted to exert said control pressure P onto a respective portion of the control zone 201a, being arranged in succession so that each single container 200, by moving forward in the direction Y, interacts one after the other with all the pads 111.

Figure 4:
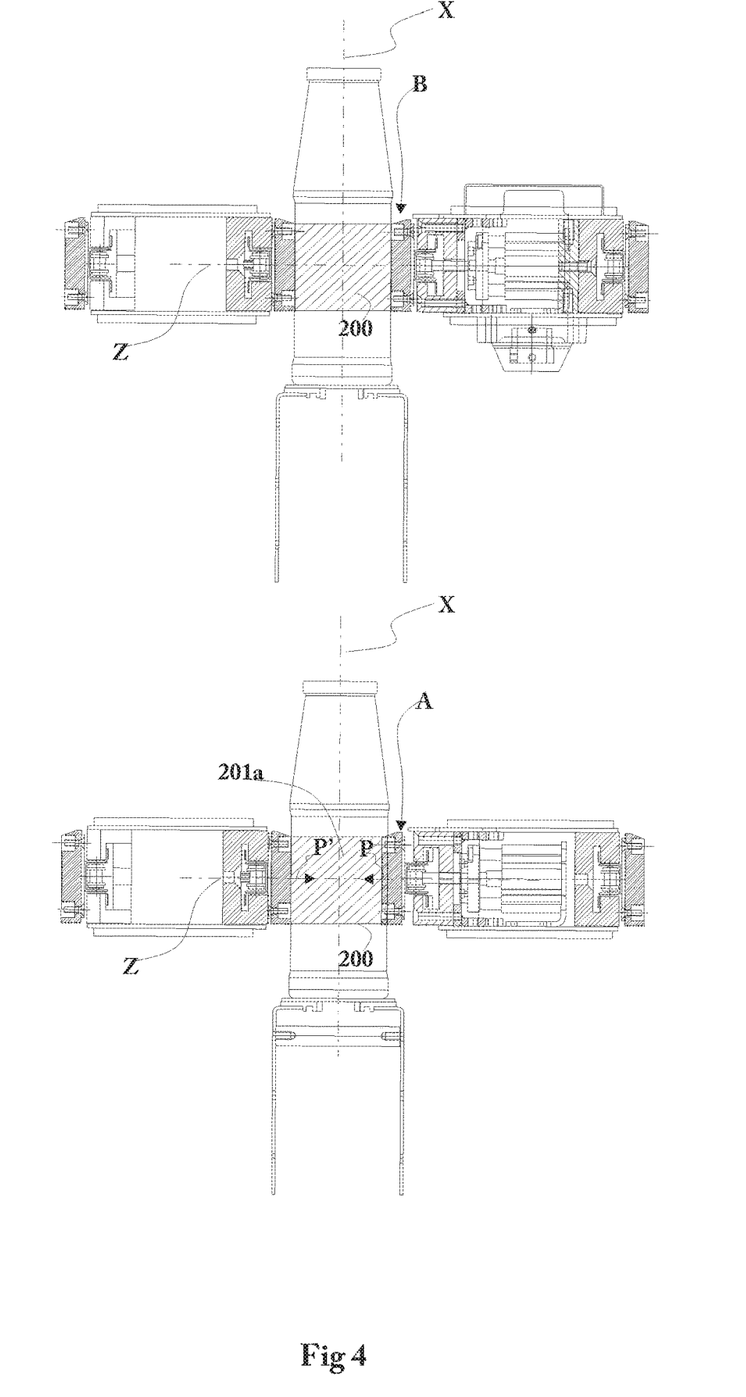
FIG. 4: illustrates the control apparatus of containers in the two working and resting positions.

The thrust device 110, and therefore the pads 111 thereof, is movable in a contact direction Z orthogonal to the forwarding direction Y between at least one working position A and a resting position B.

When in the working position A, the thrust device 110 is configured so as to exert pressure P onto one side of the container 200 by pressing the contact surface 126 against said container 200; the container 200 is simultaneously pressed against the corresponding contact surface 126' which in turn generates a counter-pressure P' equal to the pressure P on the diametrically opposite side of the container 200.

In particular, the thrust device 110 exerts said control pressure P during a rotation of the container 200 at least equal to 180°.

The minimum rotation to carry out the total control of the container 200 is equal to 180°. In fact, since the pressure P and the counter-pressure P' are diametrically opposite, the rotation of 180° allows the complete control along the entire circumferential perimeter and therefore for all 360° of the container 200.

As described above, this allows the control of the container 200 to be carried out dynamically, i.e., without stopping it. The container 200 therefore carries out an overall rotation of 180°, while it is subjected to the control pressure P in the thrust device 110 and therefore, while it is subjected to the overall action of the plurality of pads 111.

Thanks to this solution, it is possible to carry out a complete control on the entire circumferential perimeter 202 of the device and at a specific control zone 201a.

By dividing the exercise of said pressure P over several pads 111, it follows that each pad 111 of the thrust device 110 exerts the pressure P onto a portion of the circumferential perimeter 202 corresponding to a respective rotation which is a portion of the total rotation of 180° carried out inside the thrust device 110; said portion of the total rotation depends on the length of each respective pad 111.

Thanks to this solution it is not only possible to carry out a dynamic type control, but it is also possible to increase the control rate of the apparatus 100.

In fact, considering for example the case shown in FIGS. 1 and 3 in which the thrust device 110 comprises three pads 111, that which is described below occurs.

A first container 200 enters the thrust device 110 and is subjected to a pressure P exerted during the transit in the first pad 111, then it is subjected to a pressure P exerted during the transit in the second pad 111 and finally it is subjected to a pressure P exerted during the transit in the third pad 111. At the same time, when the first container 200 leaves the first pad 111 to enter the second, a second container 200 can enter the operating zone of the first pad 111 and be subjected to a pressure P exerted during the transit in said first pad 111. Once it has exited the first pad 111, said second container 200 continues the control thereof by being subjected to a pressure P exerted during the transit in the second pad 111 and finally being subjected to a pressure P exerted during the transit in the third pad 111.

At the same time, when the second container 200 leaves the first pad 111 to enter the second, a third container 200 can enter the operating zone of the first pad 111 and be subjected to a pressure P exerted during the transit in said first pad 111 and so on.

It is therefore evident that having divided the thrust device 110 into several pads 111 and therefore having divided the control into several steps, it is possible to carry out the control simultaneously on several containers 200 without affecting the correctness of the control and increasing the rate of the apparatus 100.

In the case described above in which the control is divided over three pads 111 and therefore over three steps, the control time will be approximately one third with respect to the case of control by means of apparatuses of the known type which provide only one pad.

In fact, with the known solutions, the control apparatus is able to control one container at a time, being equipped with a single pad. In fact, if the pad were to exert the pressure P onto more than one container 200 at the same time, it would not be possible to be certain that the pressure P exerted is the same on the various containers 200. For example, it could happen that a container 200 has slightly larger dimensions than the others and therefore the pad would exert a greater pressure P thereon than on the other containers 200 controlled at the same time.

Therefore, with the known solutions it is not possible to reach high control rates unless controls which are not completely reliable are carried out, which therefore prevents the use thereof in production lines with high frequency and efficiency, as those of glass factories generally are.

In order to control one container 200 at a time, it is in fact necessary to space the containers 200 by a distance greater than the length of the control apparatus or of the single pad which exerts the control pressure P onto the container 200. Consequently, the greater the space between the containers 200, the greater the speed the forwarding means 150 must be in order to meet the required production rate, which is often incompatible with the stability of the containers and with the integrity thereof.

In fact, to guarantee the production rate, the speed of the forwarding means 150, expressed for example in meters per minute, must be greater than or equal to the number of containers 200 per minute required by the line, multiplied by the pitch thereof expressed in meters.

The presence of a control device 110 which comprises a plurality of pads 111 means that the pitch between one container 200 and the other must be slightly greater than or equal to the length of the longest pad 111 (for example in the case of a pad 120 mm long, the pitch between one container 200 and another can be 140 mm).

Therefore, the higher the number of pads 111, the shorter the length thereof and therefore the smaller the pitch between containers 200.

It follows that a reduced pitch allows to reach high rates even while maintaining low forwarding means 150 speeds, as evident from the calculation of said speed, described above. Low forwarding means 150 speeds guarantee a greater stability and integrity of the containers 200.

According to a preferred embodiment, in order to carry out said control cycle, the pads 111 are arranged in sequence so that each single container 200 interacts one after the other with all the pads 111 as it moves forward.

Preferably said pads 111 are arranged one after the other without leaving empty spaces between one and the other. In this way, while the container 200 moves forward and rotates, it is always located within the working zone of at least one pad 111. This guarantees complete control along the entire circumferential perimeter 202 of the container 200, since the rotation always occurs while the container 200 is engaged or in contact with a pad 111 and therefore subjected to the control pressure P thereof.

According to an aspect of the invention, each pad 111 exerts said control pressure P onto a respective portion of the control zone 201a which preferably extends for a length equal to the perimeter 202 divided by the number of pads 111. Therefore said control pressure P is exerted by each pad 111 during a rotation of the container 200 equal to 180° divided by the number of pads 111.

Said solution therefore provides that the pads 111 all have the same length and therefore the same length of the working zone. The container 200 inside the working zone of each pad 111 runs through the same space and carries out the same rotation.

Since, as previously described, the pitch between one container 200 and the next must be slightly greater than or equal to the length of the longest pad 111, in this case, since all the pads are of the same length, the pitch between containers 200 is optimized.

Figure 3:
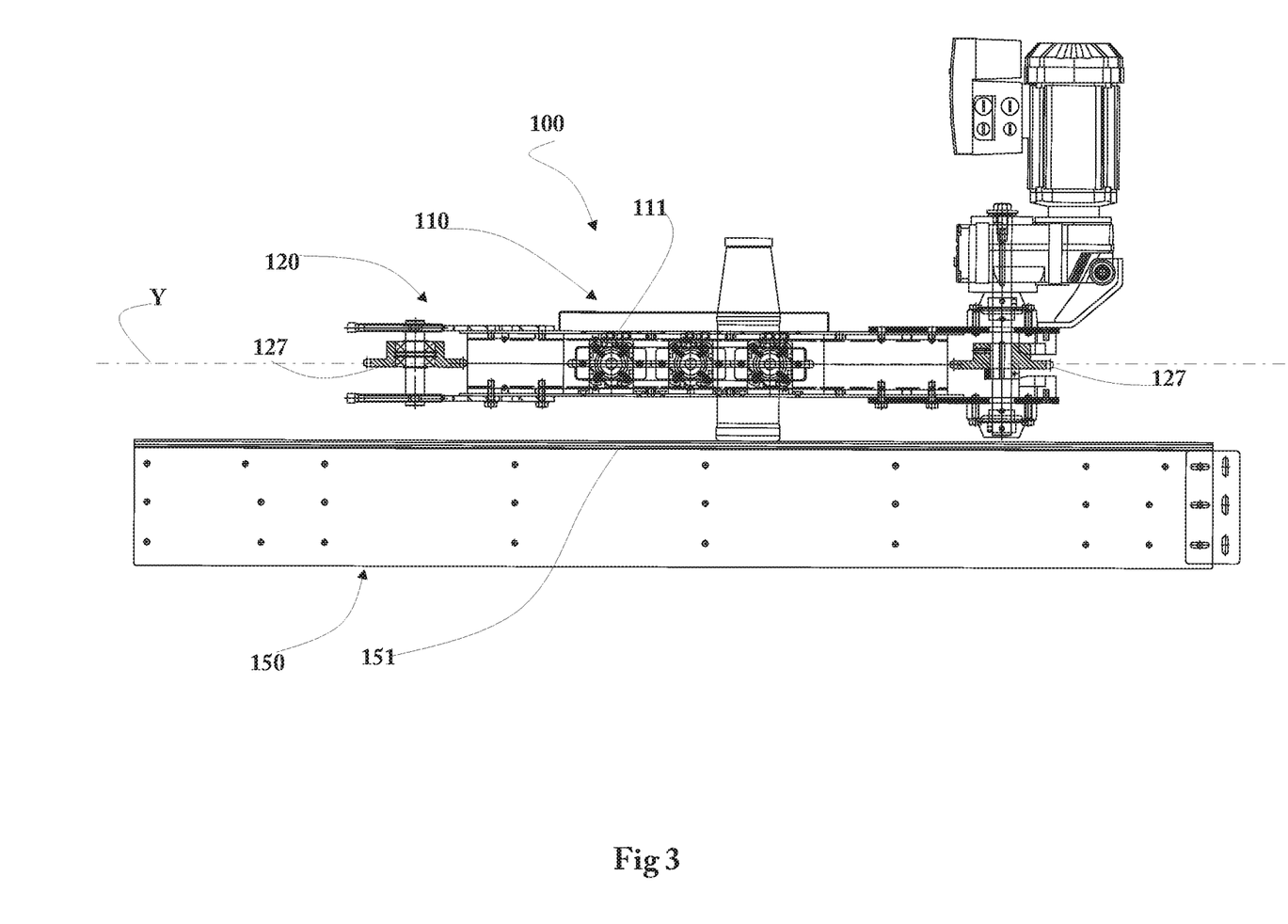
FIG. 3: illustrates in front view the control apparatus of containers.

Therefore, according to the embodiment shown in FIGS. 1 and 3 in which the thrust device 110 comprises 3 identical pads 111, the container 200 carries out a rotation of 60° inside each pad 111 i.e., equal to one third of the total rotation of 180°.

The pads 111 can be independent of the rotation means 120 and therefore arranged thereabove or therebelow or according to a preferred embodiment, the pads 111 can be integrated in the rotation means 120.

As shown in FIG. 4, said pads 111, when they are in the working position A, can be arranged so as to exert a thrust against the container 200 by means of a portion of the first and/or second operative member 121, 121', so as to exert the control pressure P onto the container 200.

In particular, the pads 111, in the working position A, are arranged so as to push a portion of the flexible towing member 125, 125' causing the contact surface 126, 126' to press against the container 200, exerting the control pressure P.

Thanks to this solution, the correct rotation of the container 200 is guaranteed, when it is subjected to the control pressure P; in fact, possible slipping which can occur during contact with, for example, pads 111 independent of the rotation means 120 is avoided.

In fact, by directly pushing a portion of the flexible member 125, 125', the pads 111 cause the contact surface 126, 126' to press against the container 200, while said contact surface 126, 126' translates in the forwarding direction Y. Therefore the contact surface 126, 126', which presses on the container 200, moves together with the container 200 in the forwarding direction Y thereof, preventing any slippage thereof.

The slippage would in fact cause an uncertainty in the control of the container 200 relative to the fact that the control extends along the entire perimeter thereof.

As shown in FIG. 4, an embodiment provides that only one of the operative members 121, or 121', provides for being brought into the working position A, being movable in said contact direction Z.

Therefore, the pads 111 are arranged so as to push a portion, for example, of the first operative member 121, while the second operative member 121' cannot be moved in the contact direction Z.

Then the pads 111 push a portion of the first operative member 121, pressing it against the container 200 when they are in the working position A, to exert the control pressure P; said container 200 will in turn press on the second operative member 121' receiving therefrom the pressure P' equal to and diametrically opposite to P.

A preferred embodiment provides that during the working step of the apparatus 100, the pads 111 maintain the working position A and therefore the portion of the first operative member 121 in thrust, which must engage with the container 200 by exerting the control pressure P; only when the apparatus is not working or is at a standstill, the pads 111 can be returned to the resting position B.

By always maintaining the working position A, the thrust device 110 allows a greater rate, not having to wait for the displacement of the pad 111 upon the arrival of each container 200.

FIG. 1 highlights, for example, the case where the flexible towing member 125, 125' is a roller chain 125a and the contact surface 126 comprises dowels 126a mechanically associated with the links 125b of the roller chain 125a. In this case the pads 111 may comprise a plate 112 adapted to push a portion of the roller chain 125a in the contact direction Z of the container 200; said plate 112 engages with the roller chain 125a on the opposite side of the contact surface 126.

The plate 112, for example, has a thickness such that it can come into contact with the rollers of the chain 125a so as to reduce the friction during the sliding of the roller chain 125a on said plate 112.

Said solution is therefore effective and simple to implement.

According to what has been described above, since the pads 111 are preferably arranged one after the other without leaving empty spaces therebetween, each plate 112 has a length equal to the total length of the control zone, divided by the number of pads 111.

Furthermore, in order to push the flexible towing member 125, 125' towards the container 200, the movable pads 111 can comprise an actuator 114, for example of the pneumatic type.

In the solution of FIGS. 1 and 2 said actuator 114 is mechanically connected to the plate 112.

In any case, it is understood that any alternative solution which allows the translation of the flexible towing member 125, 125' in the contact direction Z falls within the scope of protection of the invention.

If the actuator 114 is of the pneumatic type, a pressure reducer can be provided for managing the control pressure P.

Different solutions can be provided for the management of the control pressure P, such as for example the thrust device 110 can comprise a single pressure reducer which works in a centralized manner, i.e., it controls all the actuators 114. In this case, said actuators 114 are managed so as to exert the same control pressure P.

Alternatively, a pressure reducer can be present for each actuator 114. In this way, each pad 111 could exert different control pressures.

A preferred embodiment provides for said pressure reducer to be of the programmable type, i.e., it can be managed via software being operatively connected to a control unit of the apparatus 100. This allows the control pressure P to be varied as a function of, for example, the type of container 200 and automatically, without the manual intervention of the operator.

Thanks to this solution, each container 200 format can be directly linked to a software recipe, a dedicated control pressure P and calibrated precisely to the control specifications thereof.

It is also an object of the present invention to provide a method for controlling the mechanical strength of containers 200, in particular made of glass.

Said method can be carried out for example by means of a control apparatus 100 of the type described above.

In particular, the method provides for actuating the control on a control zone 201a extending along an entire perimeter 202 of the outer surface 201 of the container 200.

To carry out this control, it is provided for:

forwarding the container 200, simultaneously rotating the container 200 about the axis of symmetry X thereof orthogonal to the forwarding direction Y controlling the container 200, during the rotation, exerting a control pressure P onto the control zone 201a.

The control of the container 200 is subdivided into multiple steps, in which in each step, it is provided for exerting said control pressure P onto a respective portion of the control zone 201a, and it is provided that each single container 200 is subjected, in succession, to each step during the forwarding movement thereof and the rotation thereof.

In this manner, while a container 200 is subjected to a given control step, the container 200 which precedes it is simultaneously subjected to the preceding control step, while the container 200 which follows it is simultaneously subjected to the subsequent control step.

Said portion of the control zone 201a checked in a given step extends along a portion of the circumferential perimeter 202. The sum of all the portions of the control zone 201a checked in each step is equal to the overall control zone 201a extending along the entire perimeter 202.

Preferably, the control pressure P is exerted along the entire circumferential perimeter 202 during a rotation of the container 200 greater than or preferably equal to 180° between the beginning of the first step and the end of the last step.

In fact, an equal and diametrically opposite counter-pressure P' corresponds to said control pressure P.

The minimum rotation for carrying out the total control of the container 200 is therefore equal to 180°. In fact, since the pressure P and counter-pressure P' are diametrically opposite, the 180° rotation allows the complete control along the entire circumferential perimeter thereof and therefore for all the 360° thereof.

According to a preferred embodiment, each step provides for exerting said control pressure P onto a respective portion of the control zone 201a extending by a length equal to the circumferential perimeter 202 divided by the number of steps, and where said control pressure P is exerted during a partial rotation of the container 200 equal to 180° divided by the number of steps.

This implies that the single steps are all the same, or more precisely, in each of them the container 200 carries out a rotation having the same amplitude in degrees and therefore a portion of the control zone 201a of the same length is controlled.

This facilitates the management of the control and optimizes the pitch between one container 200 and another.

As previously explained, the optimization of the pitch between containers 200 has as a consequence the optimization of the rate of the apparatus 100.

According to an aspect of the invention, the method provides that each single container 200 is subjected to each step preferably continuously, that is to say passing directly from one step to the next.

This allows controlling the container 200 dynamically, i.e. without stopping it. Thanks to this solution, it is therefore possible to carry out a complete control at a specific control zone 201a extending along the entire circumferential perimeter 202 without the risk of uncontrolled portions being present.

To better clarify, in a given step it is provided for controlling a respective portion of the control zone 201a, and in the preceding and/or subsequent step, it is provided for controlling a respective portion of the immediately preceding and/or subsequent control zone 201a.

Thanks to this solution it is not only possible to carry out a dynamic type control, but it is also possible to increase the control rate of the apparatus 100 since there are no dead or waiting times in the passage from one step to another.

In particular, the method provides working by dividing the control into several steps, precisely to increase the work rate.

In fact, said method preferably provides that while a container 200 is subjected to a certain control step, the container 200 which precedes it is simultaneously subjected to the preceding control step, while the container 200 which follows it is simultaneously subjected to the subsequent control step.

It is therefore evident that having divided the control into several steps, it is possible to carry out the various steps of said control simultaneously on several containers 200 without affecting the correctness of the control and increasing the frequency thereof.

In particular, the number of control steps is a function of the work rate, i.e., the number of containers 200 which must be controlled in a given time interval.

In fact, having divided the control into a plurality of steps means that the time between the start of the control of a container 200 and the start of the control of the next container 200 must be slightly greater than or equal to the time for carrying out the longest step; in the preferred case in which the steps are all of the same duration, said time must be slightly greater than or equal to the time to carry out a single step.

Therefore, the greater the number of steps, the shorter they are and the shorter the time which elapses between the start of the control of one container 200 and the next.

It follows that a high number of steps allows to reach high rates, also maintaining low forwarding speeds of the containers 200.

A preferred aspect of said method provides that the control pressure P exerted in each step can be adjustable according to the type of container 200.

Furthermore, each step can preferably provide a pressure different from the other steps.

It is understood however that what is described above has a value of non-limiting example, therefore, possible variants of detail that may be necessary for technical and/or functional reasons, are considered from now falling within the same protective scope defined by the claims indicated below.

The invention claimed is:

1. A method for controlling the mechanical strength of a glass container (200), by means of a control apparatus (100), which provides for actuating the control on a control zone (201a) extending along an entire circumferential perimeter (202) of the outer surface (201) of the container (200), the method comprising:
   forwarding the container (200) according to a forwarding direction (Y),
   simultaneously rotating the container (200) about the axis of symmetry (X) thereof orthogonal to the forwarding direction (Y)
   controlling the container (200), during the rotation, exerting a control pressure (P) onto the control zone (201a), wherein the control being subdivided into multiple steps, and
wherein, in each step, said control pressure (P) is exerted onto a respective portion of the control zone (201a), and each single container (200) is subjected, in succession, to each step during the forwarding movement thereof and the rotation thereof.

2. The control method according to claim 1, wherein the control pressure (P) is exerted along an entire circumferential perimeter (202) of the container (200) during a rotation of the container which is equal to 180° between the start of the first step and the end of the last step, since corresponding to said control pressure (P) is an equal and diametrically opposite counter-pressure (P').

3. The control method according to claim 1, wherein each step provides for exerting said control pressure (P) onto a respective portion of the control zone (201a) extending by a length equal to the circumferential perimeter (202) divided by the number of steps, and where said control pressure (P) is exerted during a partial rotation of the container (200) equal to 180° divided by the number of steps.

4. The control method according to claim 1, wherein each step is carried out in a continuous manner, passing directly from one step to the next one.

5. The control method according to claim 1, wherein in a given step, a respective portion of the control zone (201a) is controlled, and in the preceding and/or subsequent step, a respective portion of the immediately preceding and/or subsequent control zone (201a) is controlled.

6. The control method according to claim 1, wherein the number of control steps is a function of the working rate, which corresponds to the number of containers (200) which must be controlled in a given time interval.

7. The control method according to claim 1, wherein the control pressure (P) exerted in each step can be adjusted as a function of the type of container (200).

8. An apparatus (100) for controlling mechanical strength of a glass container (200), configured to operate on a control zone (201a) extending along an entire circumferential perimeter (202) of an outer surface (201) of the container (200), the apparatus (100) comprising:
   forwarding means (150) to forward the container (200) inside the control apparatus (100),
   rotation means (120) configured to rotate the container (200) about an axis of symmetry (X) thereof during the forwarding movement thereof in a direction (Y) orthogonal to the axis of symmetry (X),
   a thrust device (110) configured to exert a control pressure (P) onto the control zone (201a), wherein said thrust device (110) comprises a plurality of pads (111), each being adapted to exert said control pressure (P) onto a respective portion of the control zone (201a), being arranged in succession so that each single container (200), by moving forward in the direction (Y) orthogonal to the axis of symmetry (X), interacts one after the other with all the pads (111).

9. The control apparatus (100) according to claim 8, wherein the thrust device (110) is movable according to a contact direction (Z) orthogonal to the forwarding direction (Y) between at least one working position (A) and a resting position (B) and configured so as to exert, when the thrust device (110) is in the working position (A), the control pressure (P) onto the container (200) by means of a contact with a contact surface (126, 126') and simultaneously pushing/pressing against a corresponding contact surface (126, 126'), generating a counter-pressure (P') equal to the pressure (P) and diametrically opposite with respect to the container (200).

10. The control apparatus (100) according to claim 8, wherein the thrust device (110) exerts said control pressure (P) during a rotation of the container (200) equal to 180°.

11. The control apparatus (100) according to claim 8, wherein the pads (111) are arranged one following the other, without leaving empty spaces therebetween.

12. The control apparatus (100) according to claim 8, wherein each movable pad (111) exerts said control pressure (P) onto a respective portion of the control zone (201a) which extends for a length equal to a circumferential perimeter (202) of the container (200) divided by the number of pads, and where said control pressure (P) is exerted by each pad (111) during a rotation of the container (200) equal to 180° divided by the number of pads (111).

13. The control apparatus (100) according to claim 8, wherein the rotation means (120) comprise a first operative member (121) and a second operative member (121') which are opposite one another with respect to the container (200), which moves forward on the forwarding means (150), the first and second operative members (121, 121') are arranged so as to engage with the outer surface (201) of the container (200) and to generate rotation of the container (200) by friction.

14. The control apparatus (100) according to claim 13, wherein at least one of: the first operative member (121) or the second operative member (121') translate in the forwarding direction (Y).

15. The control apparatus (100) according to claim 13, wherein the first operative member (121) and the second operative member (121') translate in the forwarding direction (Y) according to a same direction or according to opposite directions, and have different translational speeds.

16. The control apparatus (100) according to claim 8, wherein the forwarding means (150) are a conveyor belt (151) on which the container (200) rests, which is kept with the axis of symmetry (X) thereof vertical.

17. The control apparatus (100) according to claim 13, wherein the first operative member (121) and the second operative member (121') are located at sides of the conveyor belt (151) and comprise a flexible towing member (125, 125') which is wound about transmission members (127, 127') for motion thereof, where said flexible towing member (125, 125') provides a contact surface (126, 126'), which is so shaped as to engage the outer surface (201) of the container (200).

18. The control apparatus (100) according to claim 8, wherein pads (111) are arranged so as to push a portion of at least one of the first or second operative member (121, 121'), in the contact direction (Z), compressing against the container (200) so as to exert the control pressure (P).

19. The control apparatus (100) according to claim 17, wherein movable pads (111) are arranged so as to push a portion of the flexible towing member (125, 125'), pressing the contact surface (126, 126') against the container (200) so as to exert the control pressure (P).

20. The control apparatus (100) according to claim 17, wherein the flexible towing member (125) is a roller chain (125*a*) and the contact surface (126) comprises dowels (126*a*) mechanically associated to the links (125*b*) of the roller chain (125*a*).

* * * * *